Oct. 9, 1928.
A. CARLSON
CORNER CONSTRUCTION FOR CLOSED VEHICLES
Filed Sept. 7, 1927  2 Sheets-Sheet 1
1,686,897
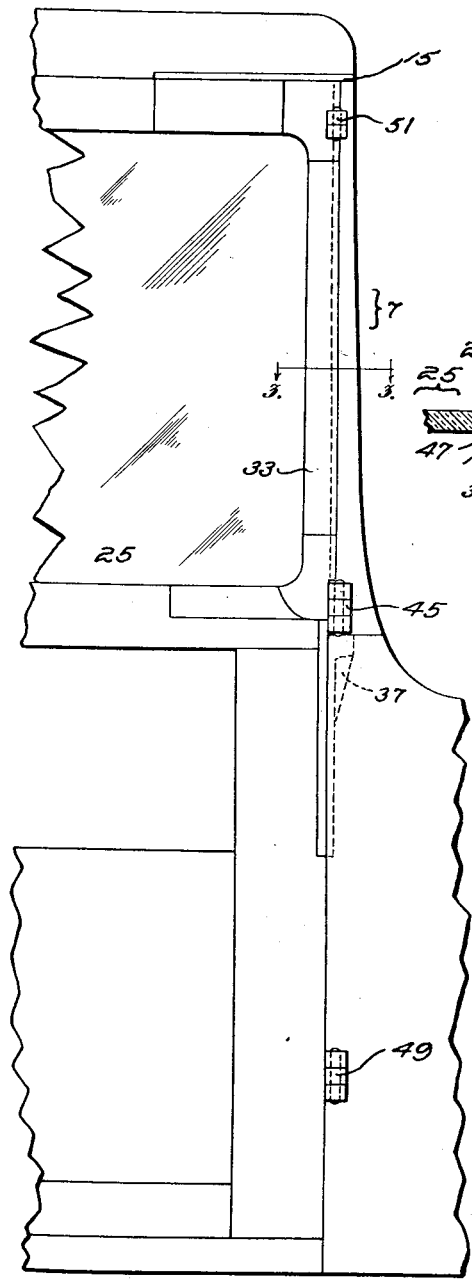
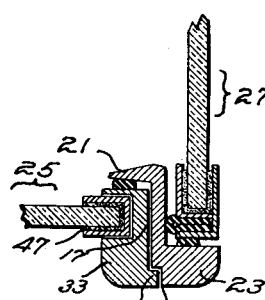
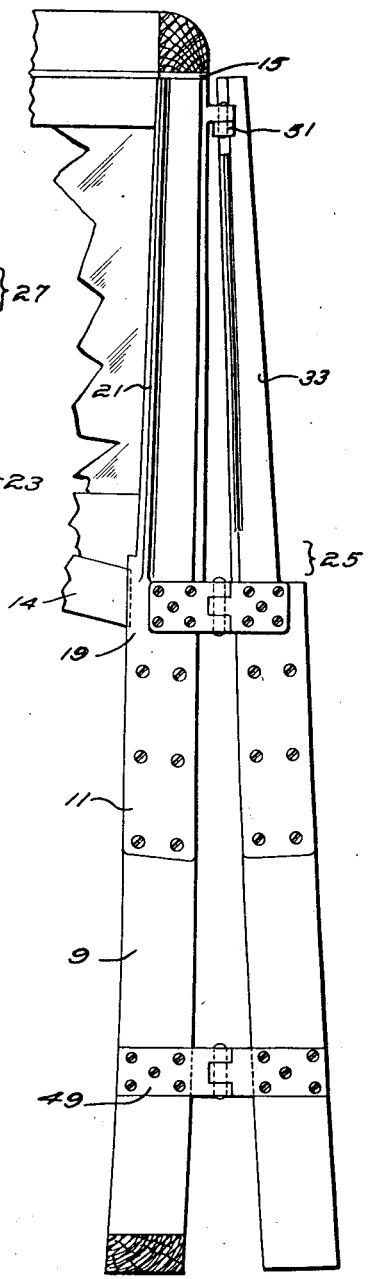
Inventor;
Alexander Carlson,
by Emery, Booth, Janney & Varney
Attys.

Oct. 9, 1928.
A. CARLSON
1,686,897
CORNER CONSTRUCTION FOR CLOSED VEHICLES
Filed Sept. 7, 1927  2 Sheets-Sheet 2
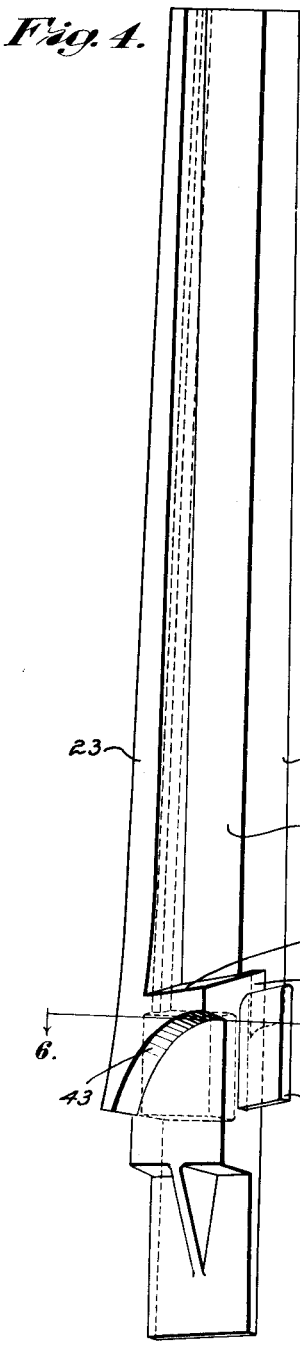
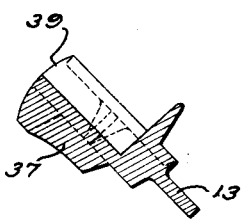
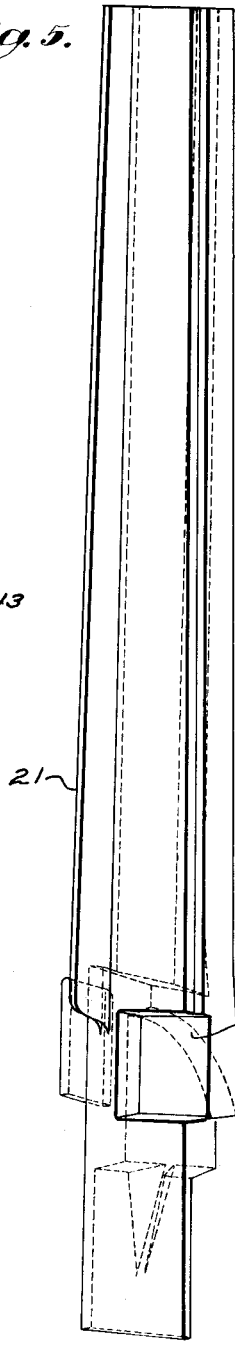

Patented Oct. 9, 1928.

1,686,897

UNITED STATES PATENT OFFICE.

ALEXANDER CARLSON, OF DETROIT, MICHIGAN.

CORNER CONSTRUCTION FOR CLOSED VEHICLES.

Application filed September 7, 1927. Serial No. 217,933.

This invention relates to automotive vehicles of the closed type, and the object is to provide a light, strong and durable construction for the forward corner of the body of such vehicles which will permit perfect driver vision.

It is now well understood that if the corner assembly of a closed vehicle; comprising the forward corner post, the door which co-operates therewith and any adjacent parts of the windshield frame; is so constructed that the transverse dimension as viewed by the driver is somewhat less than the distance between his eyes there is no material obstruction to his vision of exterior objects. To provide for an assembly of the requisite small dimensions the cooperating parts must in themselves be made small, and a real problem is presented if they are to be made of adequate strength and lightness. This is particularly the case since it is well recognized that the forward corner of the vehicle, and particularly the junction of the corner post of the top with the framework of the under part of the body, is a critical point in the construction of the vehicle as it is particularly subject to strain. To incorporate in the vehicle the desirable and indeed imperatively demanded qualities of clear vision is conditioned upon the possibility of providing a construction organized within the critical dimensions which will be of adequate stability.

My invention, which is particularly designed to provide for such construction, will be well understood by reference to the following description of an illustrative embodiment thereof shown by way of example in the accompanying drawings therein.

Fig. 1 is a fragmentary side elevation of a portion of a closed automobile body, with various parts which appear in the finished vehicle omitted in order to disclose the construction;

Fig. 2 is a section through the doorway showing the right-hand corner assembly of the vehicle in elevation as seen from the interior of the vehicle with the door swung wide open;

Fig. 3 is a section on the line 3—3 of Fig. 1 on an enlarged scale;

Fig. 4 is a front elevation of the main body portion of the forward corner post as viewed from an angle;

Fig. 5 is a similar rear elevation; and Fig. 6 is a section on the line 6—6 of Fig. 4.

In the embodiment of the invention shown in the drawings the forward corner of the permanent top of the closed vehicle embodies in its construction a suitable corner post 7 which, in order to permit the top to be made of necessary small dimension, is constructed of metal and extends from the roof to a point below the belt line of the vehicle. In the example of the invention shown the body illustrated is of composite construction, and the post does not extend all the way to the sill, but a sufficient distance to permit the lower end thereof to be securely anchored to the wooden frame 9 of the lower body. The main portion of the post 7 may be formed integrally in the form shown in Figs. 4 and 5 by casting or forging, and to facilitate such an operation may be made substantially as shown, and the lower portion thereof may be extended by a portion 11 welded thereto to provide a sufficiently long part for secure anchorage to the frame 9. An integral flange 13 may be similarly extended, if desired, for securing to the cowl bar 14 (Fig. 2), and an angular anchoring member 15 may be welded to the upper end to provide for securing the same to the longitudinal and transverse rails of the permanent top.

The body of the post as a whole, as perhaps best seen in Fig. 3, may include a transverse web 17 of relatively restricted width as is necessary in order to obtain a corner providing for clear vision. The lower portion of the web 17 may be widened, as indicated at 19 in Fig. 2, adjacent the belt line where a restricted dimension is not imperative, and also for other purposes as will appear. The upper portion of the post as seen in Fig. 3 is stiffened by means of an inner, rearwardly extending rib or flange 21 and an outer, forwardly extending rib or flange 23 providing a Z-section as well illustrated in Fig. 3. The inner flange 21 as shown in that figure may provide an inner stop for the upper portion of the door 25 and may terminate adjacent the belt line as shown in Fig. 2 to permit the lower heavier portion of the door, required by the turnunder of the vehicle and for other reasons as will be best understood, to pass inwardly beyond the plane of this flange or stop. The forwardly extending rib 23 may define with the web 17 a rabbet which receives the edge of the windshield 27. The outer face of the post may be rabbeted as indicated at 29 to receive an overlap flange 31 on the door pillar 33 which co-operates therewith.

To provide a construction of adequate strength and rigidity especially at the critical point at the belt line of the vehicle without undue weight, the web-like body 17 of the post may be offset forwardly adjacent the belt to provide a box-like reinforcement 37 having upper, lower, inner and forward walls, but conveniently being open at the outer side 39. The hollow of this open sided reinforcement may be utilized as a mortise to receive the leaf or butt of a hinge by which the door is hung. The outer forwardly extending rib 23 preferably extends past the open side of this box-like reinforcement, as clearly seen from Figs. 4 and 5, bracing apart the upper and lower walls and reinforcing the forward wall thereof. The inner rearwardly extending rib 21, being cut away as already described, preferably, however, extends downwardly past the upper wall of the box and thus merges with the heavy body of material at the inner wall thereof (see Fig. 4) where the web 17 is broadened at 19. Across the forward face of the forward wall of the box-like reinforcement I preferably provide a rib 41 extending forwardly from the location where the rib 21 merges with the heavy body of material referred to, and itself merging with the lower end of the rib 23 thus serving to tie together and brace the two ribs 21 and 23, and also providing an extension and reinforcement at the upper wall of the box 37, the inner face of this wall overlapping to an extent the upper face of rib 41. The upper face of the rib 41 may be utilized as a ledge to support the windshield frame above it, and the rib may be filleted into the rib 23 as shown at 43, and conveniently the curve of this fillet is adapted to the shape of the cowl of the vehicle.

By the arrangement of parts as described, a maximum resistance to flexure at the belt line is provided for, without undue thickness or heaviness.

The box-like reinforcement 37 may be utilized as a mortise to house one, or preferably both, of the leaves or butts of a detachable hinge 45 by which the door is hung. I prefer to place both butts forwardly of the plane defined by the rear face of the post, and this will not only increase the depth of the reinforcing box but will remove the thickness of the butt into the door jamb below the belt where dimensions are not critical from the point of view of vision, and will not require any cutting away or weakening of the door pillar 33 (Fig. 3), and will permit the channel 47 for the sliding glass to be installed immediately adjacent the rearward face of this pillar so that these parts may be organized within a limited dimension and thus brought in to an assembly having clear vision characteristics in a relatively simple manner. It will be understood that the lower hinge 49 may be similarly organized, while the upper hinge 51 may be of relatively light construction and the knuckles may, if desired, be integrally formed on the post and door pillar respectively. I prefer moreover to align this hinge with the top rail or lintel of the door out of the way of the extension of the glass channel 47.

While the construction illustrated and for purposes of clarity described in detail constitutes a preferred embodiment of the invention, it is to be understood that the invention is not limited to the form shown which may be widely varied without departing from the scope of the invention which is defined in the appended claims:

1. An automobile body of the closed type having front corner assemblies of small dimension to provide clear vision for the driver, said assemblies including a top-supporting post extending from below the belt line to the roof and comprising a transverse web of small width, forwardly and rearwardly projecting ribs at the outer and inner sides, respectively, of the upper portion of the post, said web being widened adjacent the belt line and offset to provide a box-like reinforcement open at the outer side and providing a seat to house a hinge leaf, said outer rib extending along and projecting forwardly of the open side of the seat, said inner rib terminating adjacent the belt line to permit closure past the same of the thick lower body of a cooperating door but overlapping and merging with the heavy body of material at the inner wall of said seat and a transverse rib on the forward face of said web at the location of said body merging with the outer rib and tying together said inner and outer ribs whereby to provide a structure of small bulk and weight having a rigid exposed portion of small dimension adapted for close nesting with a door and windshield while providing a maximum resistance to flexion in the vicinity of the belt line.

2. An automobile body of the closed type having front corner assemblies of small dimension to provide clear vision for the driver, said assemblies including a top-supporting post extending from below the belt line to the roof and comprising a transverse web of small width, forwardly and rearwardly projecting ribs at the outer and inner sides, respectively, of the upper portion of the post, said web being wider adjacent the belt line, the rearwardly extending rib terminating adjacent the belt line, to permit the closure past the same of the lower portion of a cooperating door, but merging with said widened portion, the forwardly extending rib extending downwardly past said termination and a transverse rib on the forward face of said web merging with the forwardly extending rib and binding thereto the free lower end of the rearwardly extending rib.

3. In an automobile body of the closed type, a forward corner post arising adjacent the cowl and extending from the roof to below the belt line, said post comprising a transverse web offset at the belt line to provide a three-sided boxlike recess to house a hinge leaf, a forwardly extending flange defining with said web a rabbet for the windshield, said flange extending past the upper wall of said recess along the open side thereof.

4. In an automobile body of the closed type, a forward corner post arising adjacent the cowl and extending from the roof to below the belt line, said post comprising a transverse web offset at the belt line to provide a three-sided boxlike recess to house a hinge leaf, a forwardly extending flange defining with said web a rabbet for the windshield, said flange extending past the upper wall of said recess along the open side thereof and a second flange cooperating with the first to provide a ledge seat for the windshield and extending forwardly beyond the forward wall of said recess substantially at the location of the upper wall thereof.

5. In an automobile body of the closed type, a forward corner post arising adjacent the cowl and extending from the roof to below the belt line, said post comprising a transverse web offset at the belt line to provide a three-sided boxlike recess to house a hinge leaf, a forwardly extending flange defining with said web a rabbet for the windshield, said flange extending past the upper wall of said recess along the open side thereof, and an inner rearwardly extending flange forming a stop for the upper portion of a cooperating door extending downwardly past the upper wall of the recess.

6. In an automobile body of the closed type, a forward corner post arising adjacent the cowl and extending from the roof to below the belt line, said post being rabbeted on its forward face to receive a windshield, an integral ledge to underlie the windshield and tying together the sides of said rabbet and a recess at the rear face of said post underlying said ledge.

7. In an automobile body of the closed type, a forward corner post arising adjacent the cowl and extending from the roof to below the belt, line, said post comprising a transverse web offset substantially at the belt line to provide a boxlike reinforcement having forward, inner, upper and lower walls which also define a recess to receive a door-suspending hinge, said post being adapted to receive a windshield against the forward face of said web and having an integral ledge on said forward face to underlie such windshield and extend over the cowl of the vehicle, said ledge constituting an extension and reinforcement of the upper wall of said recess.

8. In an automobile body of the closed type a forward corner post arising adjacent the cowl and extending from the roof to below the belt line, said post comprising a transverse web offset at the belt line to provide a three sided boxlike reinforcement having inner, upper and lower walls which also define a recess to receive a door-suspending hinge and also comprising a fore and aft flange on the forward face of said web to stiffen the same and defining therewith a rabbet to receive the rear side edges of the windshield, the lower end of said rib integrally merging with the wall of said reinforcement.

In testimony whereof, I have signed my name to this specification.

ALEXANDER CARLSON.